United States Patent
Shibayama et al.

(10) Patent No.: US 7,757,115 B2
(45) Date of Patent: Jul. 13, 2010

(54) FEEDBACK CONTROL DEVICE

(75) Inventors: Yoshiaki Shibayama, Kawasaki (JP);
Yuichi Nagaki, Kawasaki (JP);
Tsutomu Yamada, Kawasaki (JP);
Hiroshi Oikawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 454 days.

(21) Appl. No.: 11/890,505

(22) Filed: Aug. 7, 2007

(65) Prior Publication Data

US 2008/0005256 A1    Jan. 3, 2008

Related U.S. Application Data

(63) Continuation of application No. PCT/JP2005/001904, filed on Feb. 9, 2005.

(51) Int. Cl.
*G06F 11/00* (2006.01)

(52) U.S. Cl. .......................... 714/12; 714/13; 709/208; 73/204.15; 324/76.79; 324/76.81

(58) Field of Classification Search ........................ None
See application file for complete search history.

(56) References Cited

U.S. PATENT DOCUMENTS

| | | | |
|---|---|---|---|
| 5,790,775 A * | 8/1998 | Marks et al. ..................... | 714/9 |
| 6,006,342 A * | 12/1999 | Beardsley et al. ............... | 714/5 |
| 6,578,158 B1 * | 6/2003 | Deitz et al. ..................... | 714/11 |
| 6,629,264 B1 * | 9/2003 | Sicola et al. ..................... | 714/15 |
| 6,681,339 B2 * | 1/2004 | McKean et al. ................. | 714/5 |
| 7,055,057 B2 * | 5/2006 | Achiwa ......................... | 714/6 |
| 7,444,541 B2 * | 10/2008 | Lubbers et al. ................. | 714/5 |
| 2001/0056554 A1 * | 12/2001 | Chrabaszcz ................... | 714/13 |

FOREIGN PATENT DOCUMENTS

| | | |
|---|---|---|
| JP | 1-287701 | 11/1989 |
| JP | 06-061985 | 3/1994 |
| JP | 08-223663 | 8/1996 |
| JP | 09-062304 | 3/1997 |
| JP | 2002-215202 | 7/2002 |
| JP | 2004-362133 | 12/2004 |

OTHER PUBLICATIONS

Japanese Office Action issued on Jun. 23, 2009 in corresponding Japanese Patent Application 2007-502501.

* cited by examiner

*Primary Examiner*—Christopher S McCarthy
(74) *Attorney, Agent, or Firm*—Staas & Halsey LLP

(57) ABSTRACT

A feedback control device capable of continuously performing high-accuracy, stable control even in cases where any of multiple controllers for controlling a controlled system becomes incapable of control action. A controller (master controller) generates control data for stably controlling a heater by feedback control, controls the heater in accordance with the control data, and sends the control data to the other controller (slave controller). The slave controller receives the control data from the master controller but does not control the heater while the master controller is operating normally. If the master controller develops anomaly and becomes incapable of normal control action, the slave controller initiates feedback control of the heater in accordance with the control data received from the master controller immediately before the anomaly occurred, and controls the heater thereafter in accordance with control data generated thereby.

6 Claims, 8 Drawing Sheets

FEEDBACK CONTROL DEVICE

This application is a continuing application, filed under 35 U.S.C. § 111(a), of International Application PCT/JP2005/001904, filed Feb. 9, 2005.

BACKGROUND OF THE INVENTION

1. Field of the Invention

The present invention relates to feedback control devices, and more particularly, to a feedback control device capable of stably controlling a controlled system by means of a plurality of controllers.

2. Description of the Related Art

There has been known a control device which includes a plurality of controllers with an identical function for simultaneously controlling a controlled system so that the controlled system can be controlled stably over a long term. In terminal equipment of an optical submarine cable network, for example, two controllers with the same function are used to control a single controlled device.

The terminal equipment in an optical submarine cable network adopts WDM (Wavelength Division Multiplexing) technology using AWG (Array Wave-guide Grating) optical multiplexer/demultiplexer so that optical beams with different wavelengths can be multiplexed to be simultaneously transmitted over a single optical fiber and also that multiplexed light can be demultiplexed into optical beams of different wavelengths.

AWG is a device whose transmission wavelengths vary with temperature because of the temperature dependence of the refractive index of silica glass, and the temperature is controlled to select the wavelengths to be multiplexed. Accordingly, stable control of the temperature is of especial importance.

The following describes a conventional feedback control device which is used, for example, in terminal equipment of an optical submarine cable network for the purpose of temperature control.

FIG. 8 is a schematic block diagram of such a conventional feedback control device.

The feedback control device 500 includes two controllers 510 and 520 for controlling the temperature of a controlled device 600 (e.g., a WDM device with AWG) to a fixed temperature. The controllers 510 and 520 have an identical function and include control data generators 511 and 521, respectively, for generating control data for stably controlling a heater 601 by feedback control, and drivers 512 and 522, respectively, for supplying electric current to the heater 601 in accordance with the control data, to drive the heater 601.

The control data generator 511, 521 comprises a subtractor 511a, 521a for calculating a deviation of the temperature measured by a sensor 602 of the controlled device 600 from a set temperature stored in a set temperature table 603 of the controlled device 600, and an integrating circuit 511b, 521b for generating control data by integrating the deviation.

The driver 512, 522 comprises a control-drive circuit 512a, 522a and a FET (Field-Effect Transistor) 512b, 522b. Based on the control data supplied from the control data generator 511, 521, the control-drive circuit 512a, 522a controls PWM (Pulse Width Modulation) for adjusting the time for which the FET 512b, 522b is switched on or off, to thereby control the current supplied from a power supply VCC to the heater 601.

During normal operation of the conventional feedback control device 500, the controllers 510 and 520 simultaneously perform feedback control to stably control the heater 601. If the heater 601 is controlled in such a manner that only one controller is operated during normal operation and that in case of failure, the other controller is operated (see, e.g., Unexamined Japanese Patent Publication No. H06-61985 (paragraph no. [0007], FIG. 1)), a momentary interruption occurs at the time of switching control modes, making the operation of the heater 601 unstable.

Thus, by using a plurality of controllers with an identical function to simultaneously control a controlled system, it is possible to continue the control action even if any controller fails, thereby enhancing availability.

In the conventional feedback control device in which the controlled system is controlled simultaneously by the multiple controllers, however, equal control currents flow from the individual controllers to the controlled system, so that the loads on the circuits are also the same. Accordingly, in cases where a controller fails or is detached, the control current and the circuit load observed by the normal controller undergo fluctuation. Since it takes time to converge the control current and the circuit load, the control action becomes unstable and high-accuracy, stable control cannot be resumed until the fluctuation ceases.

SUMMARY OF THE INVENTION

The present invention was created in view of the above circumstances, and an object thereof is to provide a feedback control device capable of continuously performing high-accuracy, stable control even in cases where any of multiple controllers for controlling a controlled system becomes incapable of control action.

To achieve the object, there is provided a feedback control device for stably controlling a controlled system by a plurality of controllers. The feedback control device comprises a master controller for generating control data for stably controlling the controlled system by feedback control, controlling the controlled system in accordance with the control data, and sending the control data, and a slave controller for receiving the control data from the master controller without controlling the controlled system while the master controller is operating normally, initiating, if the master controller develops anomaly and becomes incapable of normal control action, feedback control of the controlled system in accordance with the control data received from the master controller immediately before the anomaly occurred, and controlling the controlled system thereafter in accordance with control data generated thereby.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Preferred embodiments of the present invention will be described in detail below with reference to the accompanying drawings.

Figure 1:
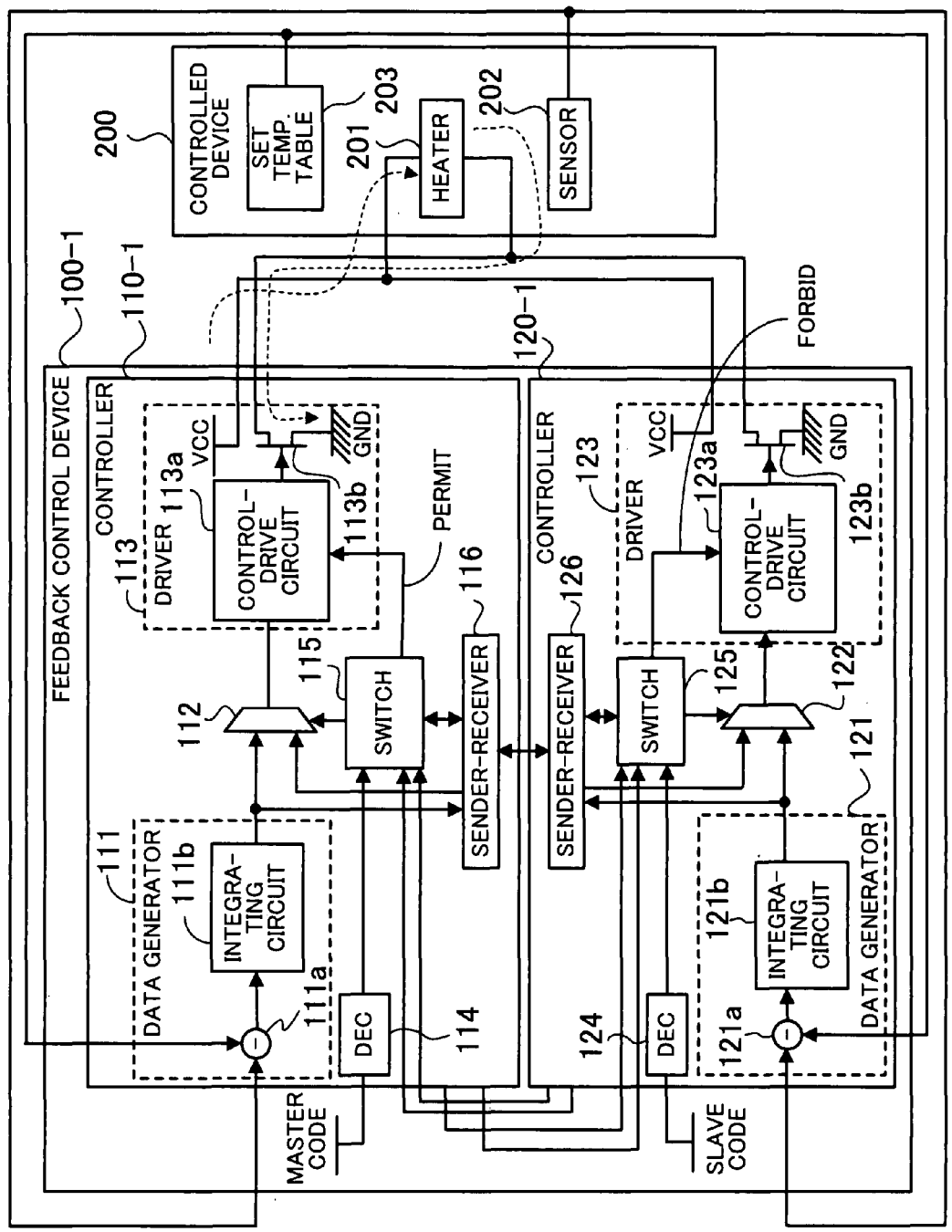
FIG. 1 shows the configuration of a feedback control device according to a first embodiment.

FIG. 1 shows the configuration of a feedback control device according to a first embodiment. The feedback control device 100-1 comprises two controllers 110-1 and 120-1 for controlling the temperature of a controlled device 200.

The controllers 110-1 and 120-1 have an identical circuit configuration and respectively include control data generators 111 and 121 for generating control data for stably controlling a heater 201 of the controlled device 200 by feedback control, selectors 112 and 122, drivers 113 and 123 for driving the heater 201 in accordance with the control data, decoders 114 and 124 for determining whether their respective controllers are a master controller or a slave controller, driver switches 115 and 125 for permitting and forbidding the respective drivers 113 and 123 to drive the heater 201, and sender-receivers 116 and 126 for sending and receiving the control data.

The control data generator 111, 121 includes a subtractor 111a, 121a and an integrating circuit 111b, 121b. The subtractor 111a, 121a calculates the deviation of a measured temperature from a set temperature, and the integrating circuit 111b, 121b generates control data by integrating the deviation.

The selector 112, 122 has one input terminal input with the control data generated by the control data generator 111, 121 and the other input terminal input with the control data generated by the other controller and received via the sender-receiver 116, 126. The selector 112, 122 selects one of the control data in accordance with a signal from the driver switch 115, 125 and outputs the selected control data.

The driver 113, 123 includes a control-drive circuit 113a, 123a and a FET 113b, 123b. In accordance with the control data selected by the selector 112, 122, the control-drive circuit 113a, 123a controls PWM for adjusting the time for which the FET 113b, 123b is switched on or off, to thereby control electric current supplied from a power supply VCC to the heater 201.

The decoder 114, 124 decodes a signal (master code or slave code) supplied from outside of the controller 110-1, 120-1 to determine whether the controller is a master controller or a slave controller. More specifically, the controllers 110-1 and 120-1 are individually configured so as to be detachable from the feedback control device 100-1, and when the controller 110-1, for example, is connected to a master controller connector (not shown), the decoder 114 is input with a master code and thus judges that the controller 110-1 is a master controller. On the other hand, when the controller 110-1 is connected to a slave controller connector (not shown), the decoder 114 is input with a slave code and thus judges that the controller 110-1 is a slave controller.

The driver switch 115, 125 determines whether to permit or forbid the driver 113, 123 to drive the heater 201, depending on whether the controller 110-1, 120-1 is a master controller or a slave controller, and supplies a permit/forbid signal to the control-drive circuit 113a, 123a.

Also, the driver switch 115, 125 detects failure of the other controller to control the heater 201, as in situations where an internal fault or a communication error has occurred in the other controller or the other controller is detached. In such cases, depending on whether the controller is a master controller or a slave controller, the driver switch 115, 125 causes the selector 112, 122 to switch the output signal and permits or forbids the driver 113, 123 to drive the heater 201 (as described in detail later).

The sender-receivers 116 and 126 communicate with each other by serial communication, to send the control data generated by the control data generator 111, 121 to the other controller and receive the control data from the other controller.

The controlled device 200 is, for example, a WDM device using AWG for multiplexing optical beams with different wavelengths and demultiplexing multiplexed light into optical beams of different wavelengths and includes, in addition to the heater 201, a sensor 202 for measuring temperature and a set temperature table 203 storing information about a set temperature. In cases where the temperature of AWG is to be controlled and the usage temperature ranges from 0 to 65° C., a certain temperature falling within a higher-temperature range of 65° C. to 80° C., for example, is employed as the set temperature in order to have the AWG perform its function.

The following describes how the feedback control device 100-1 of the first embodiment operates when the controllers 110-1 and 120-1 are detected as master and slave controllers, respectively, by the decoders 114 and 124. The feedback control device operates in like manner also when the controllers 110-1 and 120-1 are detected as slave and master controllers, respectively.

When the controller 110-1 is detected as the master controller, the driver switch 115 causes the selector 112 to select and output the control data generated by the control data generator 111. Further, the driver switch 115 sends a permit signal to the control-drive circuit 113a to permit same to drive the heater 201. Consequently, the control-drive circuit 113a switches on or off the FET 113b in accordance with the control data generated by the control data generator 111, to thereby control the current (in the figure, indicated by the dashed arrow) flowing to the heater 201. The temperature measured by the sensor 202 is fed back to the control data generator 111. The integrating circuit 111b generates control data by integrating the deviation of the measured temperature from the set temperature set in the set temperature table 203, to continuously perform feedback control. The control data generated by the control data generator 111 is continuously sent via the sender-receiver 116 to the controller 120-1 which is detected as the slave controller.

The controller 120-1 as the slave controller receives, via the sender-receiver 126, the control data generated by the master controller, namely, the controller 110-1. The driver switch 125 causes the selector 122 to select the control data received from the master controller so that the selected data may be output to the control-drive circuit 123a. Where the controller 120-1 is a slave controller, the driver switch 125 sends a forbid signal to the control-drive circuit 123a to forbid same to drive the heater 201. Consequently, the control-drive circuit 123a does not operate the FET 123b.

When the two controllers 110-1 and 120-1 are both normal, the feedback control device 100-1 operates in the aforementioned manner.

The following describes how the feedback control device 100-1 operates when the master controller fails to perform the normal control action.

In cases where an internal fault (clock anomaly, power supply anomaly, etc.) or a communication error has occurred in the controller 110-1 or where the controller 110-1 itself has been detached from the feedback control device 100-1, the controller 120-1 as the slave controller recognizes that the normal control action cannot be performed by the controller 110-1.

Figure 2:
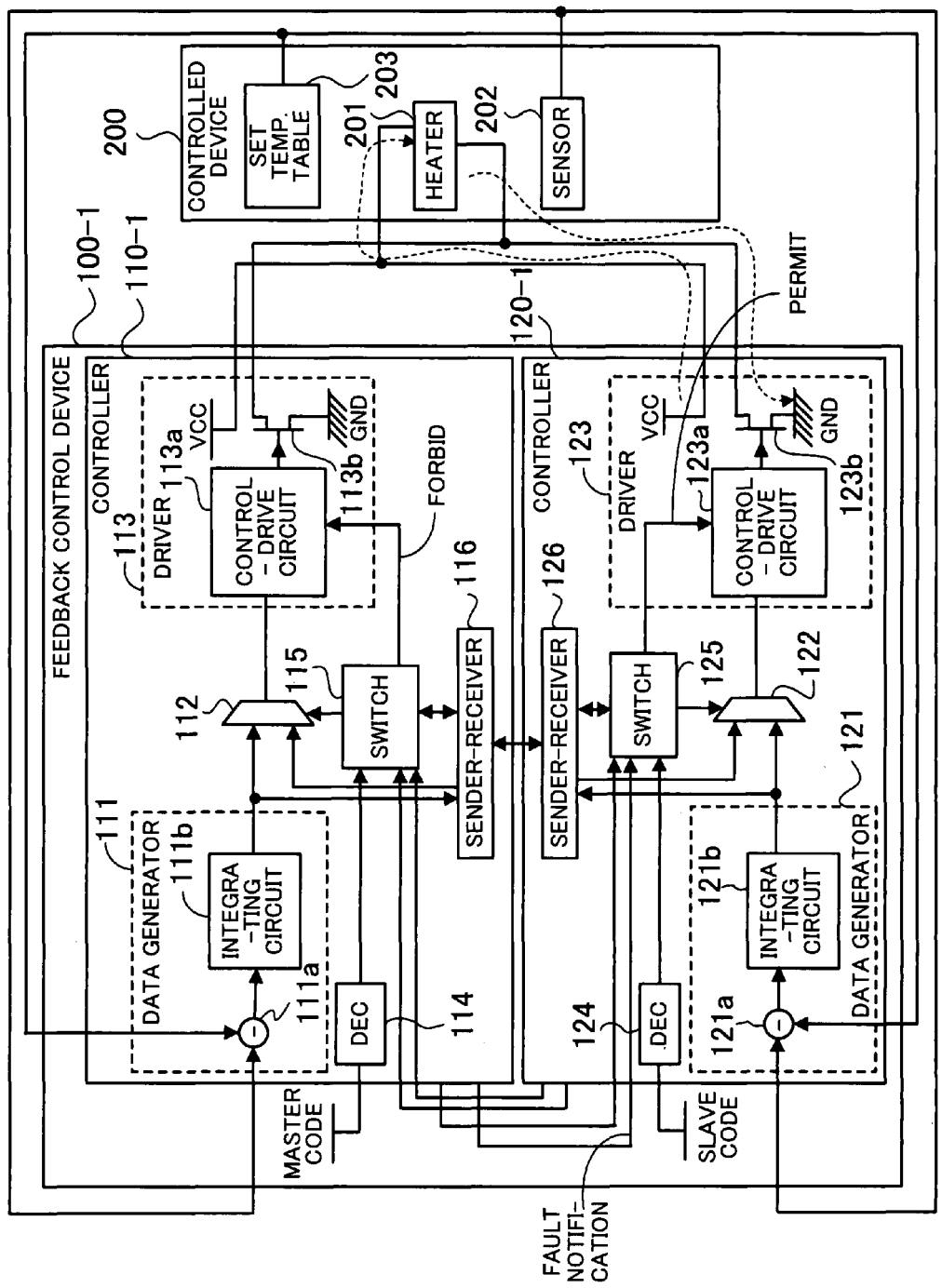
FIG. 2 illustrates how the feedback control device of the first embodiment operates in cases where an internal fault has occurred.

FIG. 2 illustrates how the feedback control device of the first embodiment operates in cases where an internal fault has occurred.

When an internal fault is detected, an internal fault detection circuit, not shown, of the controller 110-1 notifies the driver switch 125 of the controller 120-1 as the slave controller that an internal fault has occurred. At the same time, the driver switch 115 of the controller 110-1 sends a forbid signal to the control-drive circuit 113a to stop same from driving the heater 201. On the other hand, the driver switch 125 of the controller 120-1 sends a permit signal to the control-drive circuit 123a to permit same to drive the heater 201. Consequently, control of the heater 201 is initiated in accordance with the control data received from the controller 110-1 immediately before the internal fault occurred, and thus, the control-drive circuit 123a switches on or off the FET 123b to control the current (in the figure, indicated by the dashed arrow) flowing to the heater 201. After the start of the control action by the controller 120-1, the driver switch 125 causes the selector 122 to select the output of the control data generator 121, whereby the feedback control is taken over by the controller 120-1 without interruption.

If the master controller recovers from the internal fault and resumes normalcy, the driver switch 125 of the slave controller is notified that the master controller is normal. On receiving the notification, the driver switch 125 causes the control-drive circuit 123a to stop driving the heater 201. Also, the driver switch 125 causes the selector 122 to select the control data received from the sender-receiver 126. The master controller receives the control data generated by the slave controller immediately after the recovery and starts to control the heater 201 in accordance with the received control data. The feedback control of the heater 201 is thereafter carried out by the master controller in accordance with the control data generated by its own control data generator 111.

Figure 3:
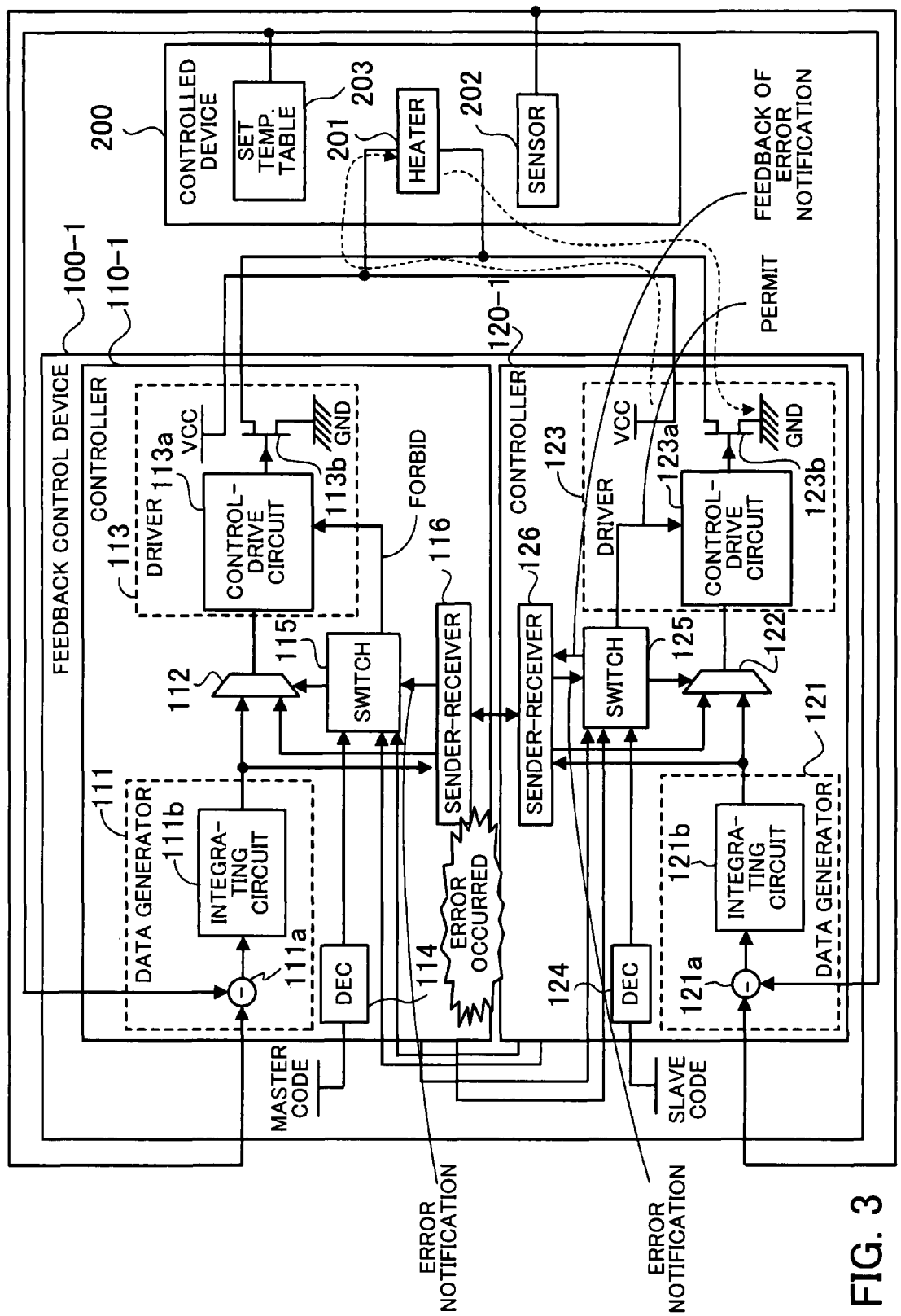
FIG. 3 illustrates how the feedback control device of the first embodiment operates in cases where a communication error has occurred.

FIG. 3 illustrates how the feedback control device of the first embodiment operates in cases where a communication error has occurred.

Where the sender-receiver 116 of the controller 110-1 as the master controller fails, for example, a communication error occurs when the control data is sent to the slave controller. The sender-receiver 126 of the slave controller detects such a communication error and notifies the driver switch 125 that a communication error has occurred. On receiving the notification, the driver switch 125 causes the sender-receiver 126 to feed back the communication error notification to the master controller. Accordingly, the driver switch 115 of the master controller sends a forbid signal to the control-drive circuit 113a to stop same from driving the heater 201, so that the control of the heater 201 by the master controller stops. On the other hand, the driver switch 125 of the slave controller sends a permit signal to the control-drive circuit 123a to permit same to drive the heater 201. Consequently, control of the heater 201 is initiated in accordance with the control data received from the controller 110-1 immediately before the communication error occurred, and thus, the control-drive circuit 123a switches on or off the FET 123b to control the current (in the figure, indicated by the dashed arrow) flowing to the heater 201. After the start of the control action by the controller 120-1, the driver switch 125 causes the selector 122 to select the output of the control data generator 121, whereby the feedback control is taken over by the controller 120-1 without interruption.

If the master controller recovers from the communication error and resumes normalcy, the driver switch 125 of the slave controller is notified that the master controller is normal. On receiving the notification, the driver switch 125 causes the control-drive circuit 123a to stop driving the heater 201. Also, the driver switch 125 causes the selector 122 to select the control data received from the sender-receiver 126. The master controller receives the control data generated by the slave controller immediately after the recovery and starts to control the heater 201 in accordance with the received control data. The feedback control of the heater 201 is thereafter performed by the master controller in accordance with the control data generated by its own control data generator 111.

Figure 4:
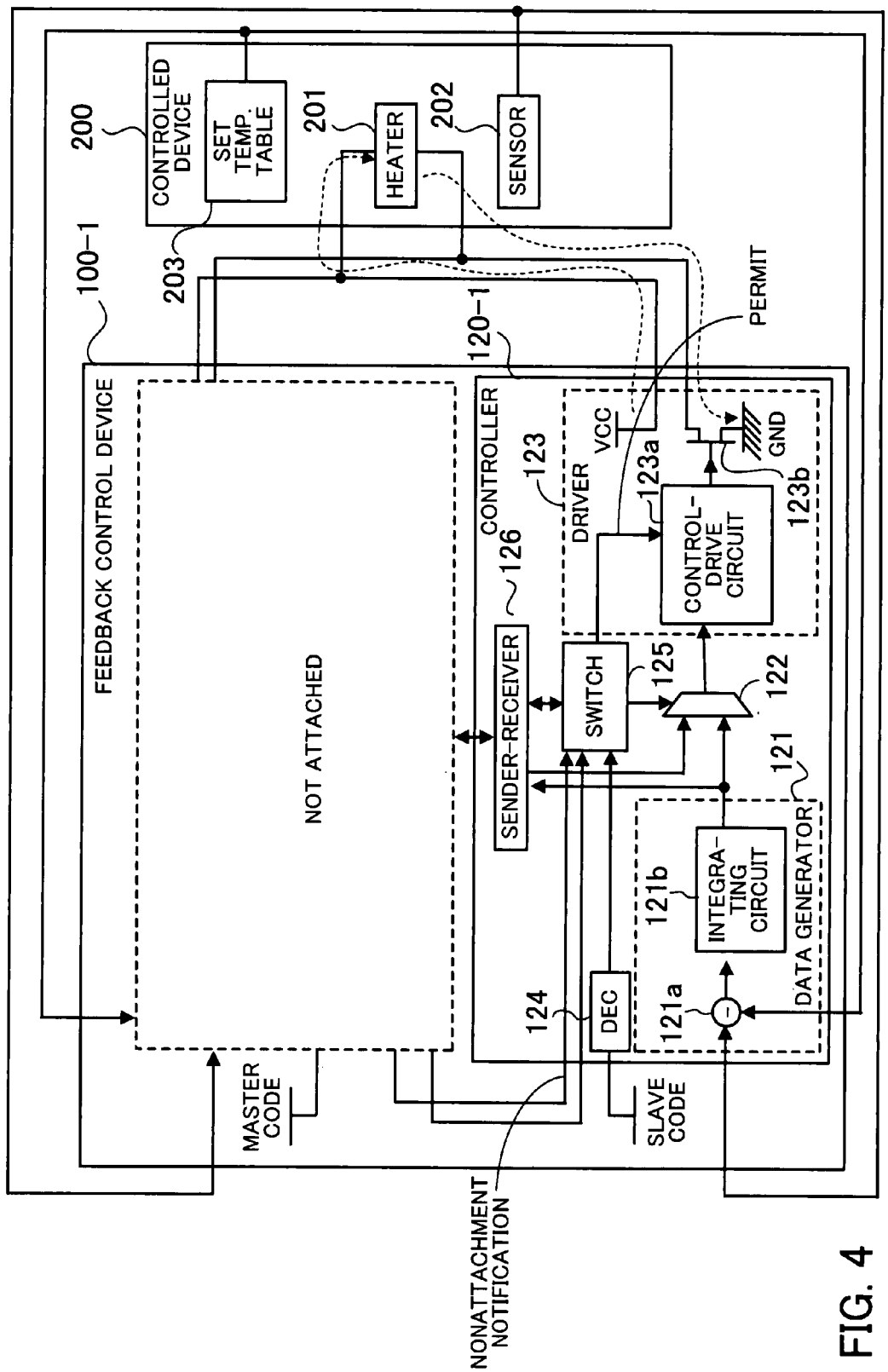
FIG. 4 illustrates how the feedback control device of the first embodiment operates in cases where a master controller has been detached.

FIG. 4 illustrates how the feedback control device of the first embodiment operates in cases where the master controller has been detached.

An attachment detector, not shown, determines whether or not the master controller is attached and, if the master controller is detached, notifies the driver switch 125 of the controller 120-1 as the slave controller that the master controller is not attached. On receiving the notification, the driver switch 125 sends a permit signal to the control-drive circuit 123a to permit same to drive the heater 201. Consequently, control of the heater 201 is initiated in accordance with the control data received from the master controller immediately before the master controller was detached, and thus the control-drive circuit 123a switches on or off the FET 123b to control the current (in the figure, indicated by the dashed arrow) flowing to the heater 201. After the start of the control action by the controller 120-1, the driver switch 125 causes the selector 122 to select the output of the control data generator 121, whereby the feedback control is taken over by the controller 120-1 without interruption.

If the master controller is attached again, the attachment detector, not shown, notifies the driver switch 125 of the slave controller that the master controller has been attached. On receiving the notification, the driver switch 125 causes the control-drive circuit 123a to stop driving the heater 201. Also, the driver switch 125 causes the selector 122 to select the control data received from the sender-receiver 126. Both of the master and slave controllers then resume their normal operation. Specifically, the master controller receives the control data generated by the slave controller immediately after the attachment of the master controller and starts to control the heater 201 in accordance with the received control data. The feedback control of the heater 201 is thereafter carried out by the master controller in accordance with the control data generated by its own control data generator.

As explained above, if the master controller fails to perform the normal control action, the slave controller starts to control the heater 201 in accordance with the control data received from the master controller immediately before the master controller failed, whereby high-accuracy, stable control can be continuously carried out by the slave controller. Also, when the master controller recovers from the failure, the control action can be stably taken over by the master controller without interruption.

A feedback control device according to a second embodiment will be now described.

Figure 5:
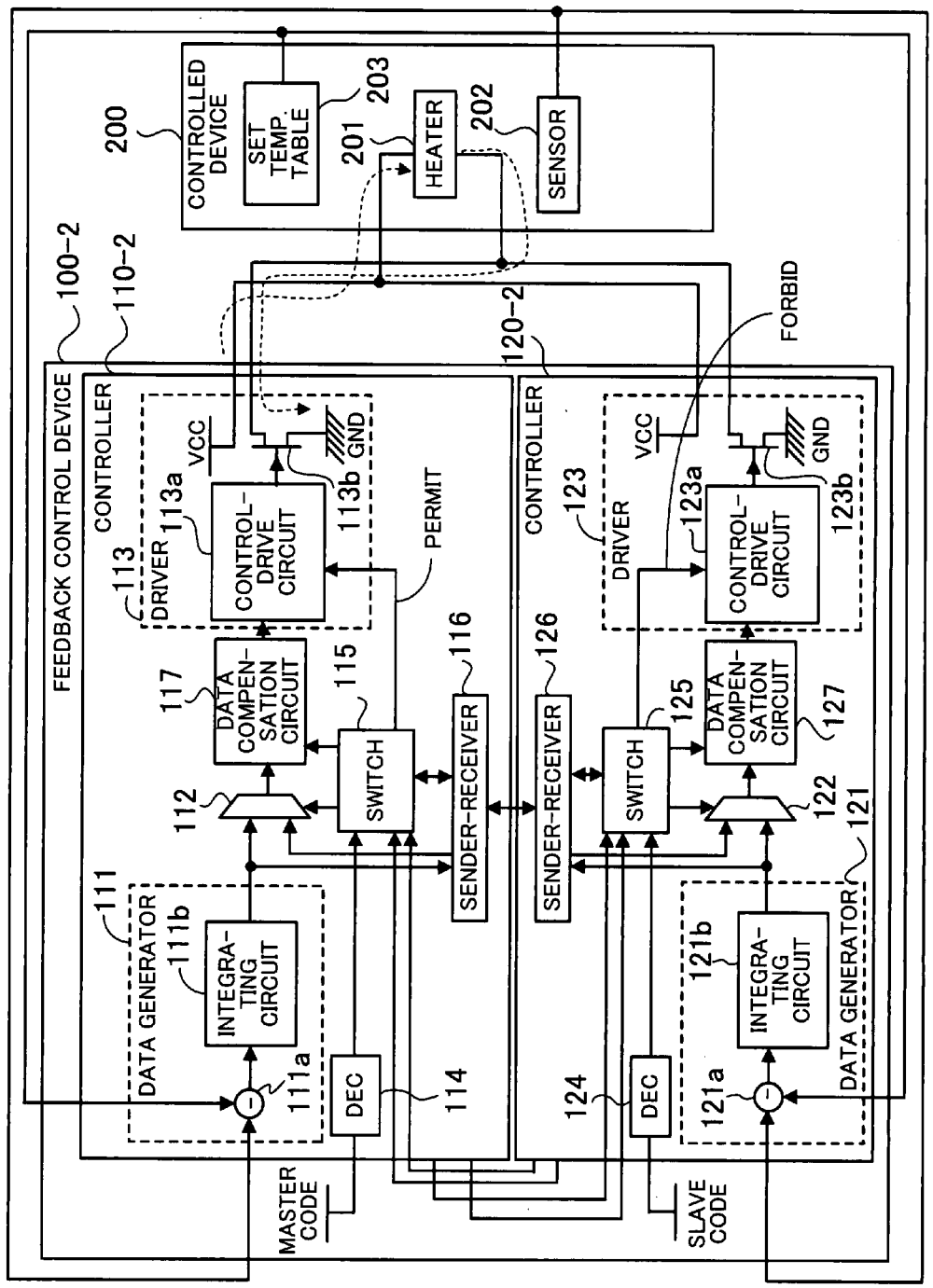
FIG. 5 shows the configuration of a feedback control device according to a second embodiment.

FIG. 5 shows the configuration of the feedback control device according to the second embodiment. In the figure, identical reference numerals are used to denote elements identical with those of the feedback control device 100-1 of the first embodiment, and description of such elements is omitted.

The feedback control device 100-2 of the second embodiment differs from the feedback control device 100-1 of the first embodiment in that a data compensation circuit 117, 127 for adding an offset value to the control data is connected between the selector 112, 122 and the driver 113, 123.

The data compensation circuit 117, 127 adds, to the generated control data, an offset value that varies depending on the number of controllers attached to the feedback control device 100-2. Namely, a different offset value is added to the control data, depending on whether both of controllers 110-2 and 120-2 are attached or one of them is detached. For example, in cases where the controller 120-2 or 110-2 is detached while the control action is performed by the controller 110-2 or where, while the feedback control device is operating with one controller attached, a second controller is attached, the load on the circuitry varies, exerting a slight influence upon the temperature control of the heater 201. Accordingly, while only one controller is attached, the offset value is set to $\alpha$, and while both controllers are attached, the offset value is set to $\beta$ ($\alpha<\beta$), for example. The offset value is switched by the driver switch 115, 125 which detects the attachment/detachment of the other controller as mentioned above.

The offset value may be varied in accordance with environmental temperature.

Figure 6:
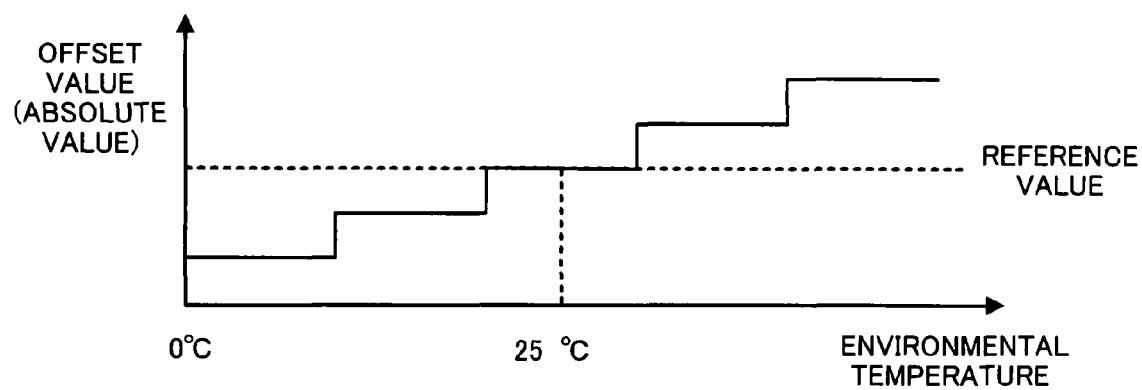
FIG. 6 shows an example of varying an offset value in accordance with environmental temperature.

FIG. 6 shows an example of varying the offset value in accordance with environmental temperature, wherein the horizontal axis indicates the environmental temperature and the vertical axis indicates the offset value.

When the environmental temperature is low, more current needs to be passed in order to control the temperature of the heater 201 to the fixed temperature, and since the control data inevitably bears a large value, the offset value to be adjusted depending on the controller attachment/detachment (depending on whether one controller or two controllers are attached) is small. On the other hand, when the environmental temperature is high, no high current needs to be passed. In this case, since the control data bears a small value and should be greatly varied depending on the controller attachment/detachment, it is necessary that the offset value be increased.

For example, using the temperature 25° C. as a reference temperature as shown in FIG. 6, the offset value is increased from a reference value when the environmental temperature is higher than 25° C., and is decreased from the reference value when the environmental temperature is lower than 25° C.

As described above, the feedback control device 100-2 of the second embodiment is provided with the data compensation circuit 117, 127 so that the offset value may be varied depending on the attachment/detachment of the controller 120-2, 110-2. It is therefore possible to restrain the temperature of the heater 201 from varying depending on the controller attachment/detachment.

Figure 7:
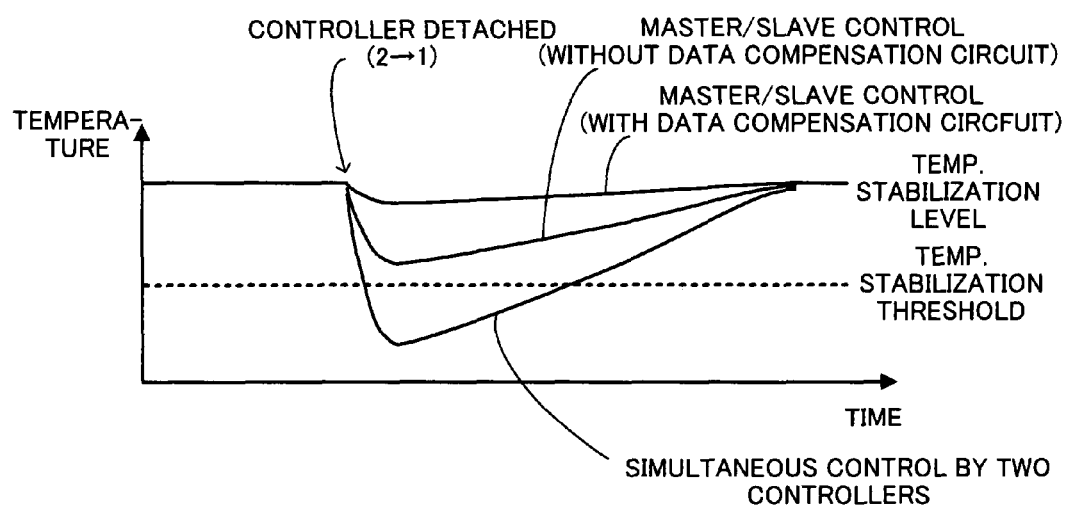
FIG. 7 shows how temperature varies when a controller is detached.
Figure 8:
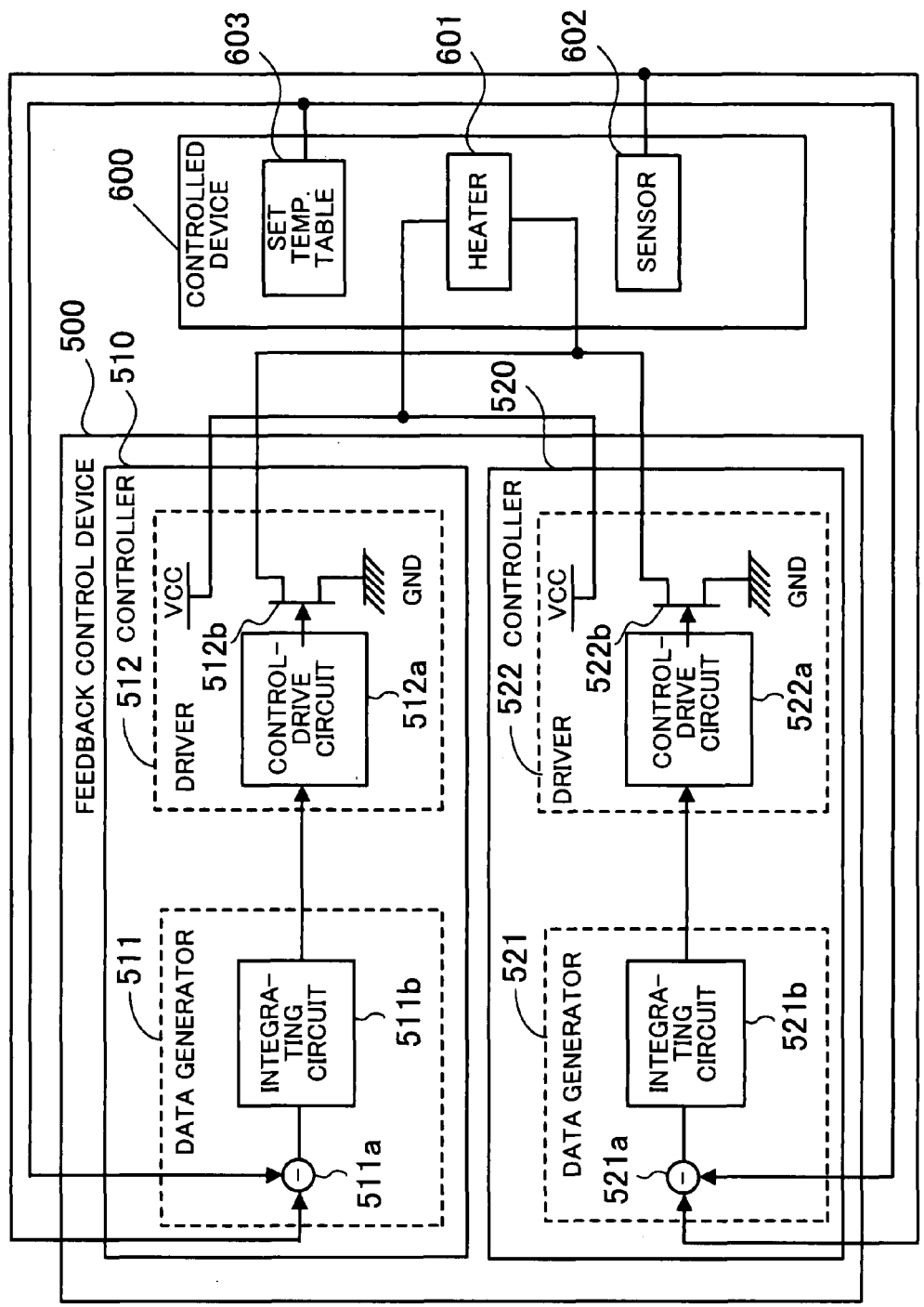
FIG. 8 is a schematic block diagram of a conventional feedback control device.

FIG. 7 shows how the heater temperature varies when a controller is detached.

As illustrated, in the conventional feedback control device in which the heater is controlled simultaneously by two controllers, the heater temperature drops below a temperature stabilization threshold. On the other hand, in the feedback control device 100-1 of the first embodiment using two controllers as the master and slave controllers, when the master controller is detached, the slave controller takes over the control action in accordance with the control data received from the master controller, whereby variation of the temperature can be reduced. Also, with the feedback control device 100-2 of the second embodiment which is provided with the data compensation circuit 117, 127 for varying the offset value in accordance with the controller attachment/detachment, it is possible to further lessen the temperature variation.

In the above description, the heater temperature is controlled to a fixed temperature. The application of the present invention is, however, not limited to such temperature control, and the invention can be used to control other controlled systems (e.g., to control the rotation of a motor).

Also, although the foregoing embodiments use two controllers, the number of controllers to be used is not limited to two. For example, one master controller and a plurality of slave controllers may be provided and operated such that the control data generated by the master controller is always sent to the slave controllers and that, if the master controller fails to perform the normal control action, one of the slave controllers takes over the control action in accordance with the control data received from the master controller immediately before the master controller failed.

The present invention is suitably applied to the temperature control of AWG used in terminal equipment of an optical submarine cable network, for example, which is required to maintain high reliability for a long term.

In the feedback control device of the present invention, the master controller generates control data for stably controlling the controlled system by feedback control, controls the controlled system in accordance with the generated control data, and also sends the control data to the slave controller. While the master controller is operating normally, the slave controller receives the control data from the master controller but does not control the controlled system. If the master controller fails to perform normal control action, the slave controller initiates the feedback control of the controlled system in accordance with the control data received from the master controller immediately before the master controller failed, and thereafter controls the controlled system in accordance with the control data generated thereby. Accordingly, high-accuracy, stable control can be continuously performed by the slave controller even in cases where the master controller becomes incapable of normal control action.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A feedback control device for stably controlling a controlled system by a plurality of controllers, comprising:
    a master controller that generates control data for stably controlling the controlled system by feedback control, controls the controlled system in accordance with the control data, and sends the control data; and
    a slave controller that receives the control data from the master controller without controlling the controlled system while the master controller is operating normally, initiates, if the master controller develops anomaly and becomes incapable of normal control action, feedback control of the controlled system in accordance with the control data received from the master controller immediately before the anomaly occurred, and controls the controlled system thereafter in accordance with control data generated thereby;

wherein the master controller and the slave controller each includes a data compensation circuit for adding, to the control data, an offset value that varies depending on a number of controllers attached to the feedback control device.

2. The feedback control device according to claim 1, wherein, if the master controller recovers from the anomaly and becomes capable of the normal control action, the slave controller sends the control data generated thereby to the master controller and stops controlling the controlled system, and the master controller starts to control the controlled system in accordance with the control data received from the slave controller and thereafter controls the controlled system in accordance with the control data generated thereby.

3. The feedback control device according to claim 1, wherein the master controller and the slave controller generate control data for controlling temperature of the controlled system to a fixed temperature, and the data compensation circuits vary the offset value in accordance with environmental temperature.

4. A feedback control device for stably controlling a controlled system by a plurality of controllers,
wherein each of the controllers comprises:
a control data generator that generates control data for stably controlling the controlled system by feedback control;
a driver that drives the controlled system in accordance with the control data;
a master/slave detector that determines whether the controller with which the master/slave detector is associated is a master controller or a slave controller;
a driver switch that permits the driver to drive the controlled system if the controller is judged to be the master controller, and, if the controller is judged to be the slave controller, forbids the driver to drive the controlled system while the master controller is operating normally;
a sender-receiver that sends the control data to the master controller or the slave controller and receives the control data from the master controller or the slave controller; and
a data compensation circuit that adds, to the control data, an offset value that varies depending on a number of controllers attached to the feedback control device, and
wherein, if the master controller develops anomaly and becomes incapable of normal control action, the driver switch of the slave controller permits the driver of the slave controller to drive the controlled system, selects the control data received from the master controller immediately before the anomaly occurred, to initiate control of the controlled system, and thereafter selects the control data generated by the control data generator of the slave controller to control the controlled system.

5. The feedback control device according to claim 4, wherein, if the master controller recovers from the anomaly and becomes capable of the normal control action, the slave controller sends the control data generated by the control data generator thereof to the master controller and stops controlling the controlled system, and the master controller selects the control data received from the slave controller to initiate control of the controlled system, and thereafter selects the control data generated thereby to control the controlled system.

6. The feedback control device according to claim 4, wherein the control data generator generates control data for controlling temperature of the controlled system to a fixed temperature, and the data compensation circuit varies the offset value in accordance with environmental temperature.

* * * * *